Feb. 11, 1969

C. W. BIMBA 3,426,656

AIR CYLINDER WITH A REMOVABLY LOCKED PISTON ROD CONNECTION

Filed June 14, 1967

Air Cylinder

Mounting Plate

Machine Part

INVENTOR:
Charles W. Bimba

BY:

*Philip J. Liggett*

ATTORNEY

United States Patent Office 3,426,656
Patented Feb. 11, 1969

3,426,656
AIR CYLINDER WITH A REMOVABLY LOCKED PISTON ROD CONNECTION
Charles W. Bimba, Crete, Ill.
(101 Main St., Monee, Ill. 60449)
Filed June 14, 1967, Ser. No. 646,052
U.S. Cl. 92—255      4 Claims
Int. Cl. F16j 1/12; F16b 9/02; B25g 3/20

ABSTRACT OF THE DISCLOSURE

In an air cylinder unit, a special connection means which eliminates the problem of having threading on the piston rod itself and in lieu thereof has a split ring in a groove positioned near the end of the rod such that a "slip-on" threaded locking nut attachable to the piston can bear against the ring and clamp the rod tightly to the piston member. A preferred construction has the split-ring and clamping nut or bushing type connection means at both ends of the piston rod such that the exterior end of the rod is also readily attached to or disconnected from the particular machine part being moved by the air cylinder unit.

Specification

The present invention is directed to an improved readily removable means for connecting a piston rod to the piston of an air cylinder or other similar form of fluid motor. More specifically, there is utilized a split ring in a groove on the piston rod and a "slip-on" threaded locking nut that is attachable to the piston and designed to bear against the ring provides a tight clamping of the rod to the piston member.

A preferred construction of the cylinder unit also utilizes the split-ring and threaded locking bushing means at each end of the rod such that both the interior and exterior ends of the rod are readily removable, or attachable, to respectively the piston and the external work load to which the air cylinder is effecting movement.

The conventional method of making a connection of a piston rod to a piston is by threading the rod, either externally or internally, and making a threaded attachment to the piston. The external threading on the rod is troublesome in that it leads to rapid rod failure. Any side thrusts and bending moments on the piston rod from the work load automatically causes high fiber stresses in the rod at the zone of the threads and with repeated reciprocating operations there is fatigue and failure in the threaded area. To compensate for thread failures, rods were made oversized and heat treated. Also, rolled threads have been used in prior art methods in an attempt to decrease the weakening effects of sharp machine cut threads.

In a somewhat less frequently used prior art type of unthreaded rod connection means, there has been the provision of cross-drilled holes and pins through the piston and into the rod; however, this system involved difficulties in lining up the holes in the piston with those of the rod. In addition, in this pin type of connection, there was considerable tensile strength weakening of the piston rod by the area used for the cross-drilled holes.

Summary of the invention

It may be considered a principal object of the present invention to provide an airy cylinder with a piston rod connection means that eliminates rod threading, pin attachments, etc. which are subject to rapid failure because of rapid reciprocating operations and bending moments that in turn lead to high outer fiber stresses on the rod itself.

It is also an object of the present invention to provide an improved piston rod connection means with respect to both the piston and a work load that will permit rapid replacement of damaged rods and whereby in situ air cylinders and pistons may be salvaged and reused so as to keep operating costs at a minimum level.

Broadly, the present invention relates to an improved form of air cylinder or fluid motor unit which provides for the ready attachment and removal of the piston rod from the internal piston member, in a manner which comprises the combination of a motor housing having a cylinder portion for an internal reciprocating piston member and at least one removable end cap portion to permit removal of the piston, a piston member sized to move within said housing and having one open end leading into an internal recessed portion, the latter having an offset shoulder portion leading to a smaller diameter rod receiving section with a blind-end, and a threaded portion adjacent section with a blind-end, and a threaded portion adjacent said open end of the piston, a piston rod member with a groove and split ring member therein spaced to be within said recessed portion of said piston member as said rod member is positioned in the latter, a locking bushing positioned around and sized to be a slip-fit over said piston rod, with said bushing having an inner end portion sized to bear against said split ring on said rod and be within said recess section of said piston member, and said bushing further having an outer threaded portion sized to engage the threaded portion on said piston member whereby the tightening of said bushing to said piston effects a resulting pressure against said split ring on said piston rod and a tight holding of the latter to the piston member.

In another aspect, the present invention provides a spaced piston rod with a groove, split ring means and a slip-fit locking bushing at each end of the rod, whereby there may be easy connection of the rod to both the piston and to the work load.

As will be seen, there is a particular advantage to having a construction means which permits the easy removability and replacement of piston rod members and the salvaging of the main cylinder housing and piston member. There is a high incidence of damage or wear to piston rods so that in a construction where there is easy replacement of the rod member, there is a greatly extended life for the main portion of the fluid motor unit and a resulting economy in the use of the improved form of air cylinder means.

The present improved construction system, as previously noted, is also of particular advantage in that it eliminates any threading on the piston rod itself. This modification in turn eliminates a source of failure, particularly where threads are of the machine cut type in a zone of high stress and fatigue.

A preferred form of piston rod construction utilizes a groove spaced from each end of the piston rod and an accompanying split ring member for each groove such that there may be slip-over locking nuts or bushings utilized at each end of the piston rod. One locking bushing is, of course, provided for a threaded connection with the piston member so as to tightly hold the internal end of the piston rod into a specially recessed portion of the piston itself. In a like manner, at the external end of the piston rod, there may be a similar slip-on nut which will serve to bear against the other split ring member and provide a tight locking and holding of the external end of the rod into or against a machine or machine part that is being reciprocated by the action of the fluid motor unit.

Reference to the accompanying drawing and the following description thereof will serve to better illustrate an embodiment of the present improved piston and pis-

Figure 1:
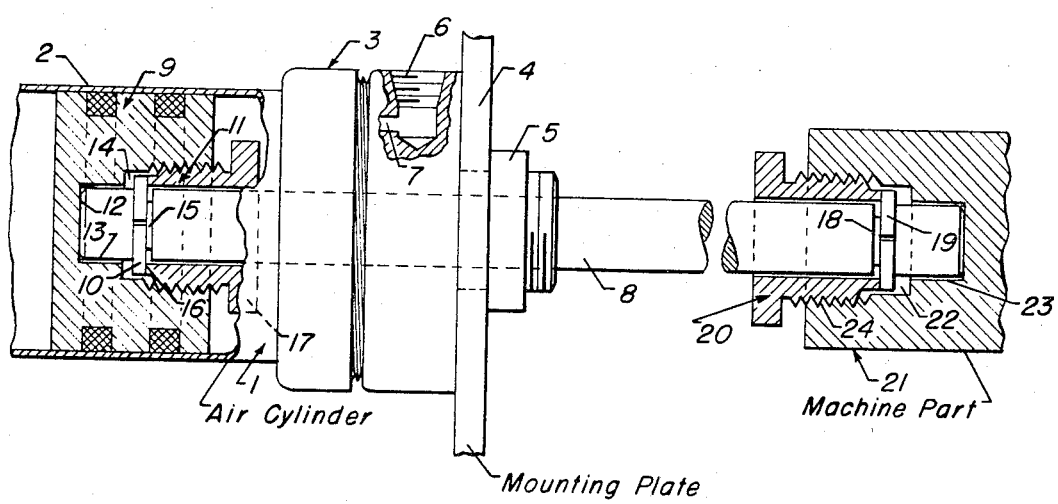
FIGURE 1 of the drawing shows, diagrammatically and partially in section, an assembly view providing for the connection of the piston rod with the internal piston member, as well as similar connection means for the external end of a piston rod with a machine part.

Referring now particularly to FIGURE 1 of the drawing there is shown an air cylinder housing 1 with a cylindrical body portion 2 and a removably attached end section 3. The latter is shown as being clamped to a suitable mounting plate 4 by an external locking nut 5 whereby to provide a suitable support for the entire motor unit 1. An air inlet, or other fluid inlet means, is indicated within the end section 3 as the tapped opening 6. The latter, in turn, communicates with fluid passageway 7 that carries to the inside of the cylinder body 2. Although not shown, the end section 3 is, of course, provided with an axially bored opening sized and adapted to accommodate the movement of the elongated piston rod member 8.

In accordance with the present invention, the piston rod member 8 will be removably held within the internal piston member 9 of the unit by the novel arrangement using a split ring 10 and a locking bushing 11. The piston member 9 is specially fabricated to have a blind end portion 12 which forms a stop at the end of a short rod-receiving opening or socket 13 and, in addition, has an enlarged internally recessed portion 14 that is sized to permit the insertion of the split ring member 10. However, the diameter of the wall which forms the recess 14 should not be so large as to permit the split ring member 10 to work out of a groove portion 15 within rod 8. In the present embodiment, the outer part of the internal recessed portion 14 of the piston member 9 is threaded to accommodate external threading on the locking nut or bushing 11. Thus, the latter can be tightened within the piston 9 and have an end bearing portion 16 contact the split ring 10 which in turn will push against the groove wall of the piston rod member 8 to hold it within the socket portion 13 and tightly against the blind end wall 12. The enlarged flanged portion 17 on the lock nut 11 may have flattened sections, or be knurled, such that wrench may be used for effecting the tightening of the bushing 11 into the piston member 9.

Figure 2:
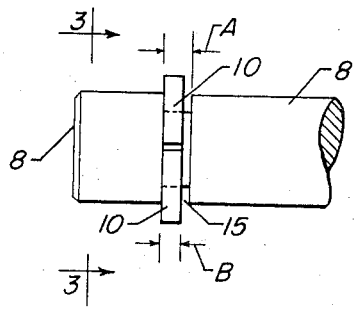
FIGURE 2 of the drawing shows, in a partially enlarged view, the positioning of a split ring member within a groove formed in the piston rod, so as to point out the lack of the need for a close fit or tolerance between the ring and groove portions.
Figure 3:
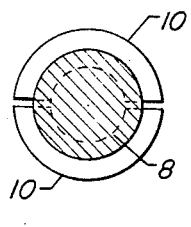
FIGURE 3 of the drawing indicates in a cross-sectional view through the piston rod member an elevational view of the split ring member within the groove of the piston rod, as shown by the line 3—3 in FIGURE 2.

As better shown in the enlarged views of FIGURES 2 and 3, the split ring member 16 need not be of a tight fit within the groove 15 on the piston rod member 8. As long as the width of groove A may be somewhat larger than the width of the ring B there will be resulting inexpensive machining and construction costs for the entire connection arrangement. However, in order to attain good bearing surfaces for effecting the tight locking of the rod to the piston member, the groove 15 will preferably have square cut and flat perpendicular bearing surfaces for contact with corresponding flat wall surfaces on the split ring member 10. Still further, the depth of the groove 15 shall be sufficient to attain a desired adequate bearing surface with the split ring 10, but not so deep as to cause excessive weakening of the piston rod member 8.

For assembly purposes, the split retainer ring means 10 will generally be of two parts, as noted in FIGURE 3, such that there may be easy insertion of the ring member into the groove 15. Also, as has been noted, the diameter of the recessed portion 14 in piston 9 shall be constructed or formed to a dimension to be only slightly larger than the external diameter of the resulting split ring member 10 after its insertion into rod member 8. This will insure the proper holding of split ring 10 within the groove 15 after insertion of the end of the piston rod into the piston member 9.

A preferred embodiment of the improved air cylinder or fluid motor unit will also have the external end of the piston rod 8 provided with a groove 18 and split ring means 19 as well as a slip-fit locking nut or bushing 20. The latter will be of same type as locking bushing 11, such that there may be a suitable clamping of the external end of the piston rod 8 into the machine part which is to be operated by the fluid motor unit. Thus, in a construction which is similar to that for the internal piston member 9 of the air cylinder 1, the machine will have a part 21 for attachment to the piston rod which in turn has an internal recess portion 22 for encompassing the split ring member 19 and a rod-receiving socket portion 23 having a blind end or stop to hold the work end portion of rod 8. Internal threading 24 is also indicated to accommodate external threading on the bushing 20 so that there may be a tightening of the latter into the machine part 21. By having this construction arrangement, there is easy removability of the piston rod from both the machine part and the air cylinder piston whereby an entire new piston rod may be connected into operation within a manner of minutes and there is an economical salvaging of the old piston and air cylinder housing. It is, however, not intended to limit the present piston to piston-rod connection means to any one type of attachment to the machine part inasmuch as clevis and pin connections or other types of linkages may readily be utilized.

It may be pointed out that still other modifications may be made within the scope of the present invention, particularly with respect to details or the shapes and configuration of parts. For example, different types of retainer rings and groove shapes may be involved to provide for the desired bearing faces between the two and for the end of the locking nut. Still further there may be variations in the type or shape of the locking bushing and the threaded attachment with respect to the piston member. As a modification, there may be a cap screw type of clamping through the flange of a locking bushing into the piston, rather than the threaded attachment. As still another variation, there may be external threading on a hub portion of the piston and an internal threading arrangement on a portion of the locking bushing so that the latter fits over and accommodates itself to the external threading on the piston portion. In any case, there shall be a slip-on type of lock nut and an effective axial movement with respect to the tightening adjustment between the locking nut and the piston member 9 such that there may be bearing against the split ring member 10 and a tightening of the entire end of the rod 8 into an internal recessed portion of the piston 9.

With respect to the split rings themselves, it is possible to use a "one-piece" ring for the rings 10 and 19. Each ring will have a fairly large slot or opening which is of sufficient size to snap over the piston rod within a groove 15 or 18 and not fall off the rod. Thus, as used in this application, the terms "split-ring" or "split retainer ring" shall refer to two half rings or to a one piece ring which has a slot sized to snap fit over the grooved portion of the piston rod.

I claim as my invention:

1. An improved fluid motor unit providing for ready attachment and removal of the piston rod from the internal piston member, which comprises in combination, a motor housing having a cylinder portion for an internal reciprocating piston member, a piston member sized to move within said housing and having one open end leading into an internal recessed portion, the latter having an offset shoulder portion leading to a smaller diameter rod-receiving section with a blind end and a threaded portion adjacent said open end of the piston, a piston rod member with a groove and split ring member therein spaced to be within said recessed portion of piston member as said rod member is positioned in the latter, a locking bushing positioned around and sized to be a slip-fit over said piston rod, with said bushing having an inner end portion sized to bear against said split ring on said rod and be within said recess section of said piston member, and said locking bushing further having a threaded portion sized to engage the threaded portion on said piston member whereby the tightening of said bushing to said piston effects a resulting pressure against said split ring on said piston rod and a tight holding of the latter to the piston member.

2. The improved fluid motor unit of claim 1 further characterized in that the groove of said piston rod has transverse perpendicular bearing surfaces adapted to accommodate said split ring member and provide transverse straight bearing surfaces therebetween and said split ring member has a bearing projecting beyond said groove to accommodate the end portion of said locking bushing.

3. The fluid motor unit of claim 1 further characterized in that said piston member is provided with internal threading sized to engage external threading on a body portion of said locking bushing whereby as the latter is tightened into the piston member there is bearing and locking against said split ring within said groove of said piston rod.

4. The improved fluid motor unit of claim 1 further characterized in that the external end portion of said piston rod member also has a groove at a short distance from such end thereof for holding a second split ring member and a second locking bushing is positioned around said piston rod in a slip-fit therewith, and said bushing has a bearing end sized to contact said split ring member whereby there may be a tightening of such external end portion of the piston rod into a machine part having a recessed portion sized and adapted to receive the end of the piston rod member and the holding of said locking bushing.

References Cited

UNITED STATES PATENTS

| | | | |
|---|---|---|---|
| 970,903 | 9/1910 | Fennel | 92—255 X |
| 2,726,887 | 12/1955 | Pierotti | 287—20 |
| 2,750,240 | 6/1956 | Naab | 92—255 X |
| 2,768,037 | 10/1956 | Payne | 287—20 X |
| 2,971,496 | 2/1961 | Geyer | 92—169 X |

FOREIGN PATENTS

| | | |
|---|---|---|
| 560,738 | 7/1958 | Canada. |
| 1,059,198 | 11/1953 | France. |

CARROLL B. DORITY, JR., *Primary Examiner.*

U.S. Cl. X.R.

287—20